US006829644B2

(12) United States Patent
Aufderheide

(10) Patent No.: US 6,829,644 B2
(45) Date of Patent: Dec. 7, 2004

(54) METHOD AND SYSTEM FOR ASSIGNING RESOURCES IN A COMMUNICATIONS SYSTEM

(75) Inventor: Bernd Aufderheide, Melle (DE)

(73) Assignee: Siemens Aktiengesellschaft, Munich (DE)

( * ) Notice: Subject to any disclaimer, the term of this patent is extended or adjusted under 35 U.S.C. 154(b) by 725 days.

(21) Appl. No.: 09/804,130

(22) Filed: Mar. 11, 2001

(65) Prior Publication Data

US 2001/0054107 A1 Dec. 20, 2001

(30) Foreign Application Priority Data

Mar. 10, 2000 (DE) .......................................... 100 11 655

(51) Int. Cl.[7] .............................................. G06F 15/173
(52) U.S. Cl. ...................... 709/226; 709/229; 710/116; 710/244
(58) Field of Search ................................ 709/225, 226, 709/229; 710/116, 118, 243, 244

(56) References Cited

U.S. PATENT DOCUMENTS

| 5,812,950 | A | * | 9/1998 | Tom ............................ 455/440 |
| 6,073,177 | A | * | 6/2000 | Hebel et al. ................. 709/228 |
| 6,088,732 | A | * | 7/2000 | Smith et al. ................. 709/229 |
| 6,098,109 | A | * | 8/2000 | Kotzur et al. ............... 709/249 |
| 6,442,550 | B1 | * | 8/2002 | Rajamony .................... 707/10 |
| 6,467,002 | B1 | * | 10/2002 | Yang .......................... 710/116 |

* cited by examiner

Primary Examiner—David Wiley
Assistant Examiner—Scott M. Collins
(74) Attorney, Agent, or Firm—Bell Boyd & Lloyd LLC

(57) ABSTRACT

A system and method with which competing resource requests can be processed in accordance with a predefined priority list of the different requesting processes, without necessitating a real-time operating system or a complete handshake protocol mechanism for processing the messages between an assignment device and requesting devices or processes. The methods and systems can be used in service-feature servers of switching devices which are preferably connected via a CTI interface to the switching device.

10 Claims, 5 Drawing Sheets

METHOD AND SYSTEM FOR ASSIGNING RESOURCES IN A COMMUNICATIONS SYSTEM

BACKGROUND OF THE INVENTION

1. Field of the Invention

The present invention relates to an arrangement and method whereby, in a communications system, resources are allocated to a number of competing resource consumers having preferably different assignment priorities. This is done without requiring a deterministic operating system, such as a real-time operating system, or a defined communications protocol in the form of a handshake protocol. In particular, services of a switching device are assigned via a CTI interface to service features or applications in a decentralized device of the communications system.

2. Description of the Prior Art

Various interfaces between switching devices and external control computers are known. By way of example, the CSTA, TAPI or JTAPI protocol can be used on a CTI connection (Computer Telephony Integration).

This involves CTI protocols from different manufacturers. The specific meanings of the abbreviations are as follows:
- CSTA: Computer Supported Telephony Application. A protocol specified by the ECMA (European Computer Manufacturers Association).
- TSAPI: Telephony Services Application Programming Interface, an adaptation of CSTA by Novell.
- TAPI: Telephony Application Programming Interface, an interface from Microsoft.
- JTAPI: Java Telephony Application Programming Interface. A protocol specified by the ECTF (Enterprise Computer Telephony Forum).

At present, in the case of CTI applications, actions are triggered by event messages on the part of the switching device. The event messages are multiplexed and made available to the relevant applications. These applications either react with services to the event messages or else behave passively. A conflict occurs if a number of mutually competing applications wish to react differently to an event message. In the case of a number of applications running in parallel, with different response times governed by the operating system, principally the following two problems arise:
1. It is not certain that the first application which receives the event message x is also the first application which responds thereto.
2. It cannot be determined in advance when all of the applications have concluded their actions in respect of the event message x, since no acknowledgement mechanism is provided as standard via the CTI interface.

These problems have not been avoided hitherto with the currently known protocols CSTA, TAPI or JTAPI. As a rule, the assignment of resources and resource consumers has been effected deterministically. There are essentially three solution variants that are considered for such deterministic assignment.

First, by using a real-time operating system, it can be ensured that event messages sent first are actually answered first. Prioritizable processing by the resource requesters can be ensured here by the event messages first being delivered to higher-priority resource requestors. In this case, a resource requestor having the lowest priority is the last to receive a corresponding event message.

Prioritizable assignment likewise can be ensured by a handshaking mechanism. In this case, it is assumed that each received event message must be acknowledged by a corresponding potential resource requester. This acknowledgement can be effected either by outputting a resource request or by outputting a simple confirmation of reception. In a solution of this type, a central assignment device collects the acknowledgements. By access to a priority list which is present for the potential resource requestors, a respective resource is then made available to that resource requestor which has the highest priority.

Likewise, it is possible to agree to a fixed time period in which all potential resource requestors have to respond to an event message. After this time period has elapsed, a central resource assignment device can then assume that all resource requests from the individual resource requestors must have arrived. Using a priority list, the resource is then assigned to that resource requestor which has the highest priority. Resource requestors of this type may be, for example, applications or service features.

The above-described alternatives have various disadvantages, however. Temporal sequential processing of event messages and resource requests across process boundaries is not ensured by a standard operating system, for which reason a proprietary solution would have to be chosen. A proprietary solution would likewise have to be used if the intention were for a handshaking mechanism to ensure the prioritization, because no CTI specification contains the requirement that received event messages have to be acknowledged. Adherence to a defined time period as waiting time produces unnecessarily long delays and, moreover, is prone to errors.

The present invention is therefore directed to a method and a arrangement which enable prioritizable assignment of resources requested by competing resource requesters and which do not have the disadvantages described above.

SUMMARY OF THE INVENTION

Accordingly, the method of to the present invention advantageously affords the security of a handshake method without exhibiting the disadvantages of the numerous messages of a handshake protocol, because after a resource request it is only necessary to interrogate those potential resource requestors which have a higher priority than that resource requestor which has currently output its request. As such, depending on the number of allocated priorities and the number of potential resource requests, a corresponding number of acknowledgement messages are saved.

In another embodiment of the method, a resource request is sent directly to an assignment device because the latter can undertake the comparison of the priorities, (the sending of the interrogations to be acknowledged and the evaluation of the responses). The CTI connection to the switching device is being burdened by the control command for the resource assignment which has been determined by the assignment device as a consequence of its evaluation.

In a further embodiment of the method the message traffic with respect to the individual potential resource requests is controlled by the assignment device and event messages which arrive via the CTI connection from the switching device are duplicated and sent to the individual potential resource requestors. In this way, a defined and resource-sparing message traffic is ensured, without this necessitating additional devices.

In an advantageous manner, the potential resource requesters process the event messages one after the other, for example in a manner effected by a message queue, because this ensures in the system interconnection that, in connection with a response to be acknowledged, a resource request of a higher priority potential resource requestor is output to the assignment device prior to the acknowledgement of the inquiry to be acknowledged.

In another embodiment of the method the resources of a switching system are assigned to service features via a CTI connection because a service-feature server for customary switching devices can be provided in a simple manner, which server permits prioritized processing of service features.

A system having the ability to carry out the method according to the present invention is particularly advantageous because a switching device with a service-feature server is provided in this way, which server permits fast, optimal processing of resource requests without necessitating a real-time operating system or a complete handshake mechanism for its control.

In an embodiment of the system described, a decentralized device is connected to a switching device via a CTI connection, service-feature processes which require resources of the switching device running in the decentralized device. A development of this type enables prioritized service-feature control in a switching device without resulting in an increased message volume via the CTI connection.

In a further embodiment of the system described, individual resource requestors have memories for storing event messages which allow successive processing of these messages by the corresponding processes. This ensures that potential resource requesters, after receiving an inquiry to be acknowledged from the assignment device, output a resource request before they acknowledge the corresponding message.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
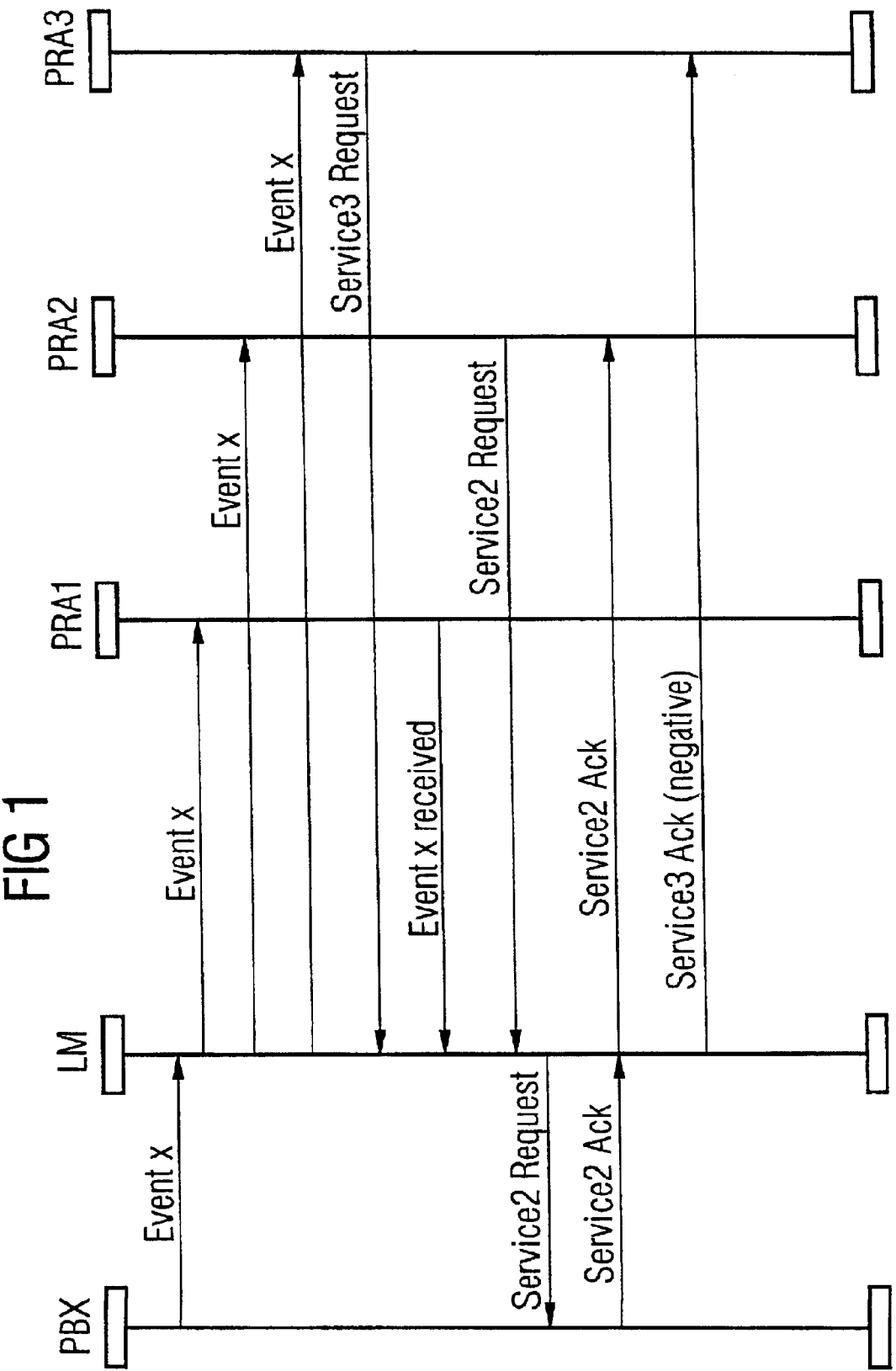
FIG. 1 shows a message sequence as is shown in the prior art.

FIG. 1 shows, in a schematic illustration, a switching device PBX, an assignment device LM and individual potential resource requestors PRA1 to PRA3. The assignment device LM contains, for example, one or 5 more priority lists which specify assignment ranks, i.e. priorities of the individual potential resource requesters, in order for messages to be sent first to higher-priority potential resource requestors. By way of example, the switching device PBX and the assignment device LM are connected to one another via a CTI interface and a corresponding connecting line.

A message sequence according to the handshaking method is shown in this example. Such a concept corresponds to the prior art but is not possible with currently available CTI protocols.

As can be discerned, the switching device PBX initially outputs an event message Event x to the resource assignment device LM. The latter sends this message in accordance with the allocated priorities for the potential resource requestors first to PRA1, then to PRA2 and last to PRA3, because PRA3 has the lowest priority. As a reaction to receiving this event message, PRA3 outputs an assignment request Service3 Request to the resource assignment device LM. Afterward, PRA1 acknowledges reception of the event message by Event x received. The reception of this acknowledgement message is interpreted in the resource assignment device LM to the effect that PRA1 does not require any resources at the moment. After the acknowledgement message just described, a resource request Service2 Request is issued by the device PRA2. Since PRA1 having the highest priority does not request any resources and PRA2 having the second-highest priority does require resources, the resource request from PRA2 and not that from PRA3 is forwarded by the resource assignment device to the switching device, whereupon the switching device PBX confirms the assignment by Service2 Ack to the assignment device, which forwards this message to the potential resource requestor PRA2. Consequently, the request from PRA3 is turned down with Service3 Ack (negative).

Figure 2:
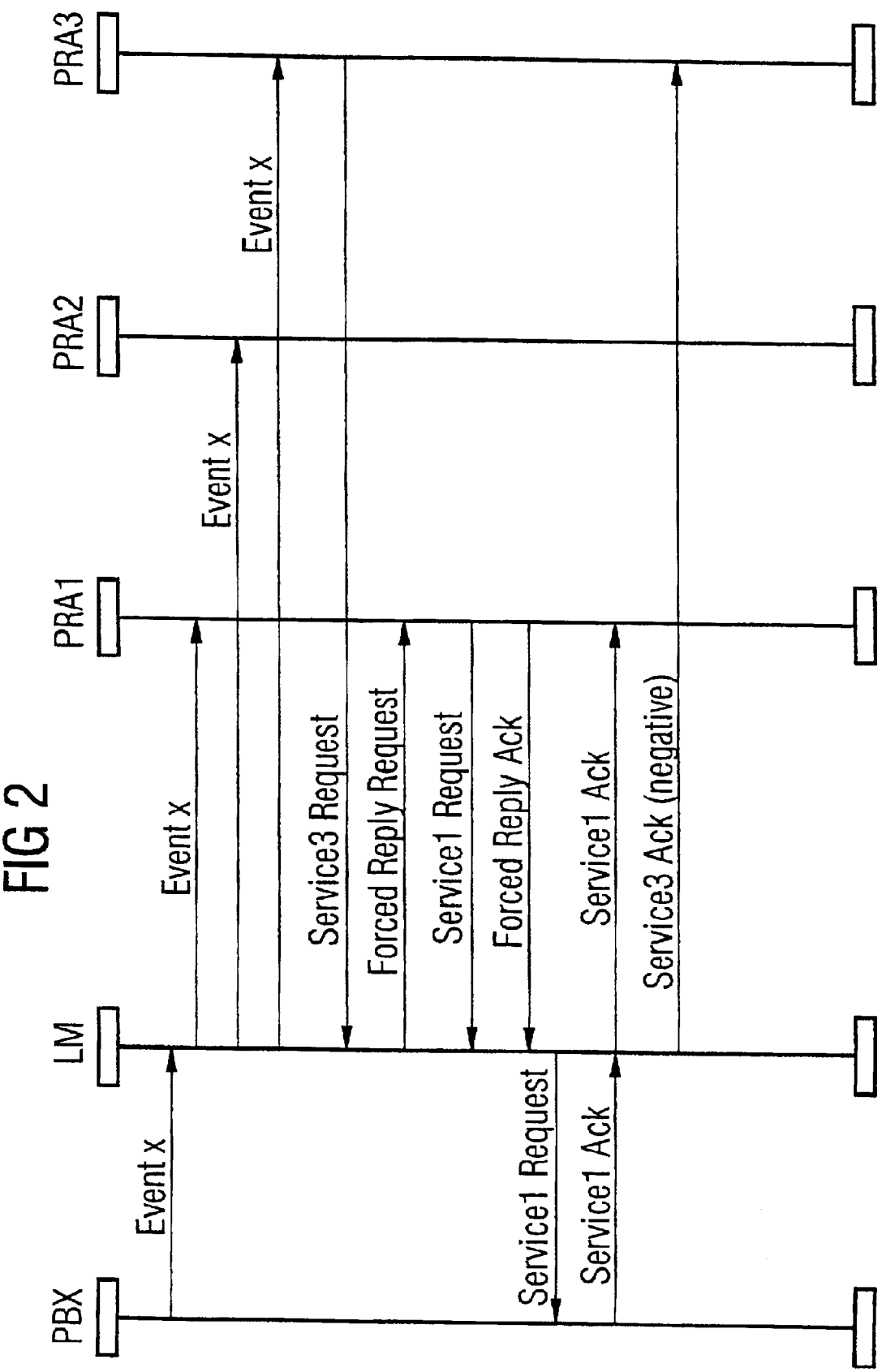
FIGS. 2 through 4 show message sequences according to the method of the present invention, in which resources are requested by resource requestors having a different assignment rank level.

FIG. 2 shows an example of resource assignment in accordance with the present invention, and of the associated message traffic. The designations of the messages and of the individual devices should understood to be analogous to FIG. 1. As a reaction to the event message Event x, PRA3 requests resources of the switching device PBX with Service3 Request via the assignment device LM. Subsequently, in evaluation of a priority list which is accessible to the assignment device LM and contains the rank order of PRA1 to PRA3 with regard to the assignment of resources of the switching device, an inquiry to be acknowledged, Forced Reply Request, is issued first to PRA1 having the highest assignment priority. The potential resource requester PRA1 acknowledges Event x with a resource request Service1 Request and the inquiry Forced Reply Request with the acknowledgement Forced Reply Ack. The message pair Forced Reply Request and Forced Reply Ack is used by the resource assignment device LM to ascertain whether PRA1 has sent a resource request Service1 Request in respect of the Event x. This is not the only possible reaction. Since PRA1 processes all messages one after the other, the message Service1 Request must necessarily arrive before the message Forced Reply Ack. LM can thus derive the following conclusions.

If a Service1 Request arrives before Forced Reply Ack, then PRA1 is interested in resource allocation.

If no Service1 Request arrives before Forced Reply Ack, then PRA1 is not interested in resource allocation.

The resource can, thus, be assigned as required to PRA2 or PRA3.

The resource assignment device LM forwards the resource assignment Service1 Request to the switching device, which confirms reception of this message with Service1 Ack to the resource assignment device LM, whereupon the latter once again outputs a message Service1 Ack to PRA1. Since PRA1 has a higher assignment priority of resources than PRA3, in a further step the resource assignment device LM outputs a message Service3 Ack (negative) to PRA3. It can be discerned in this message sequence that, in connection with message traffic of this type, message queues within the potential resource requesters PRA1 to PRA3 are advantageous. The following is ensured by the inquiry to be acknowledged (inquiry: Forced Reply Request, acknowledgement: Forced Reply Ack):

If a Service1 Request arrives before Forced Reply Ack, then PRA1 is interested in resource allocation.

If no Service1 Request arrives before Forced Reply Ack, then PRA1 is not interested in resource allocation.

The resource can, thus, be assigned as required to PRA2 or PRA3.

Figure 3:
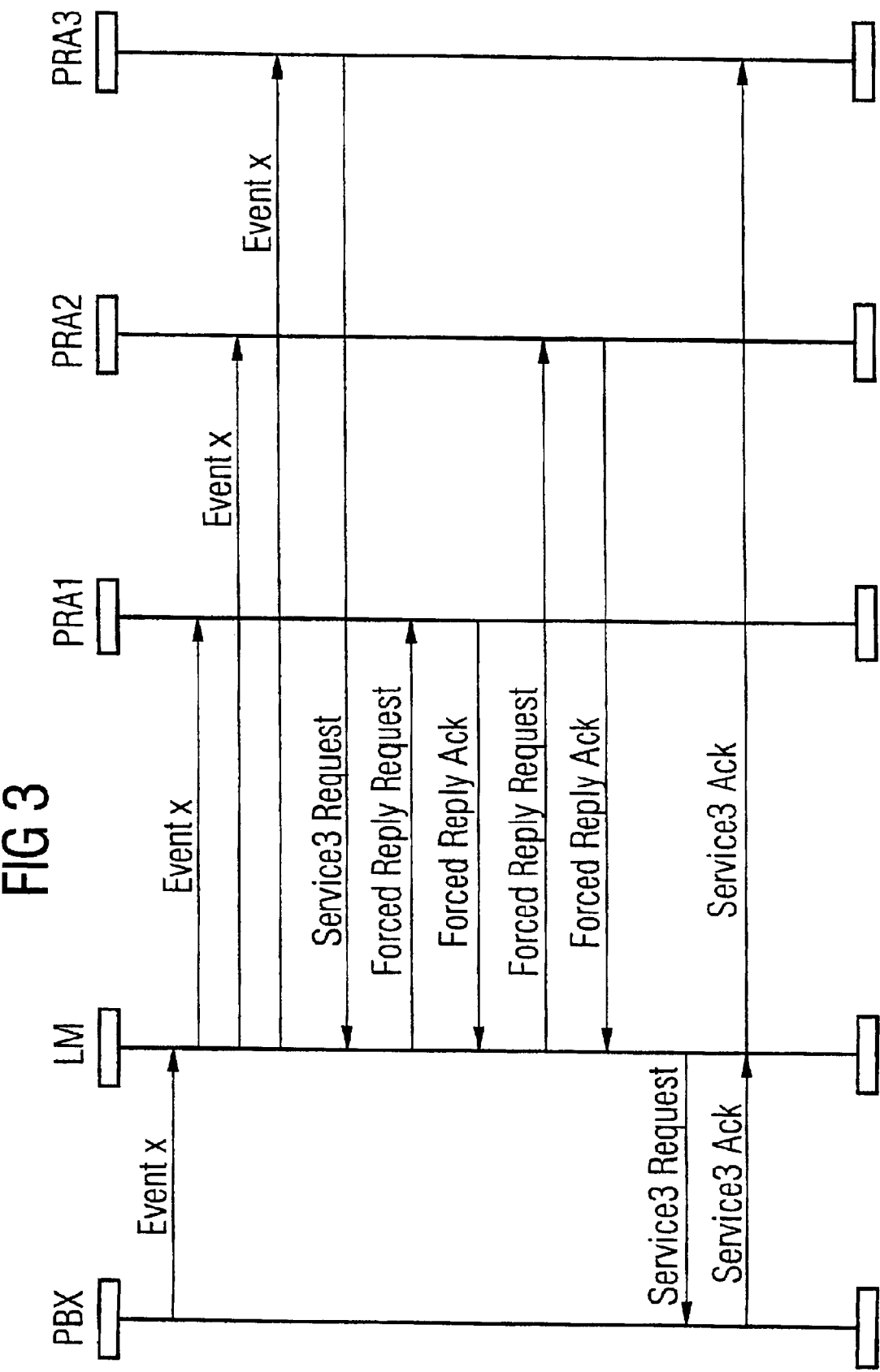

FIG. 3 shows, in an analogous manner to FIG. 2, the message traffic in a method according to the present invention in the case where the potential resource requester PRA1 does not require any resources, the potential resource requester PRA2 likewise not requiring any resources in this case. The higher-priority potential resource requesters PRA1 and PRA2 in this case output the acknowledgement messages to the resource assignment device LM. No resource request is made. In this example, the resource request of the low-priority resource requestor PRA3 can be satisfied by the assignment of resources of the switching device. In general, it should be noted that the response to a message Event x will be ServiceX Request if there is interest in resource assignment. The acknowledgement Forced Reply Ack is always issued in respect of the inquiry Forced Reply Request.

Figure 4:
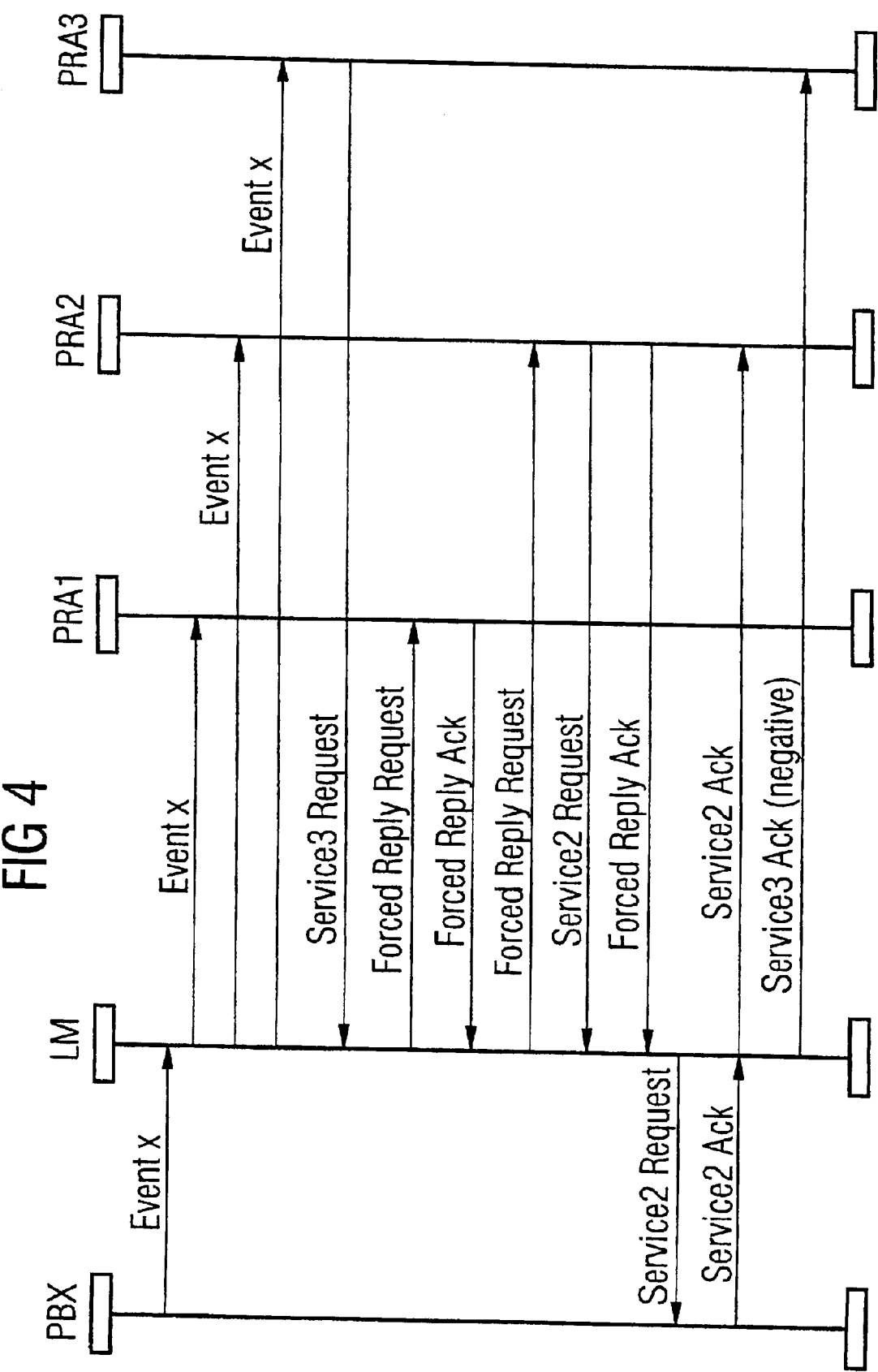

FIG. 4 shows a message traffic in which the potential resource requester PRA2 responds with a resource assignment inquiry Service2 Request as a reaction to the event message Event x from the resource assignment device LM. For this reason, a resource request made first by PRA3 is likewise turned down negatively.

In this case, a message traffic is shown in which PRA3, the potential resource requestor having the lowest priority, is the first to register its requirement at LM with Service3 Request.

However, LM sent the event message to PRA1 and PRA2 as well. The latter have not yet answered; for example, for propagation time reasons. LM therefore sends Forced Reply Request first to PRA1 having the highest priority, and receives only the acknowledgement Forced Reply Ack from PRA1 as a response. From this LM infers that PRA1 has not requested a service as a reaction to Event x. LM therefore sends Forced Reply Request to PRA2 having the second-highest priority and receives Service2 Request from PRA2 as a reaction to Event x as a response. LM receives the acknowledgement Forced Reply Ack from PRA2. From this LM infers that PRA2 requested a resource as a reaction to Event x. LM forwards the resource request Service2 Request from PRA2 to PBX. LM receives a positive acknowledgement from the switching device PBX and passes this on to PRA2 LM then acknowledges the resource request Service3 Request from PRA3 negatively with Service Ack (negative), since the resource has been allocated to PRA2.

In principle, it does not matter what inquiries to be acknowledged are sent from the resource assignment device LM to the potential resource requestors in the case where a resource request is present. What is important with regard to these messages is that a standard-conforming inquiry and response pair is selected for them. In the case of a CSTA application, such an inquiry/response pair would be, for example, "System Status". Message checks and message sending and also access to assignment rank lists are advantageously provided in customary fashion in switching devices, or in service-feature servers or in combinations thereof.

Figure 5:
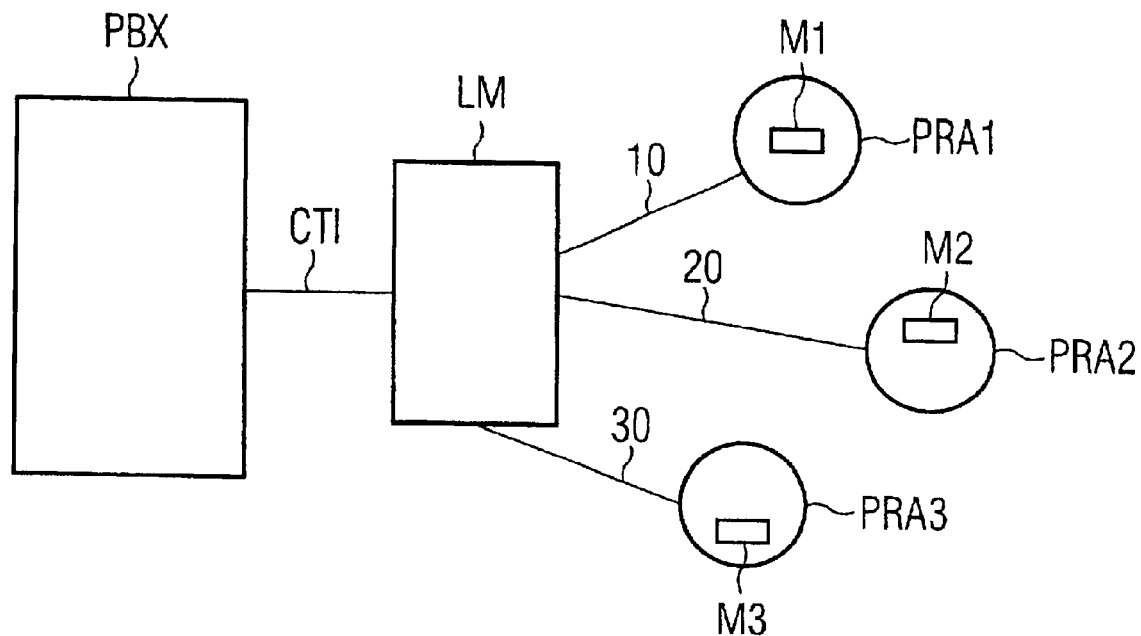
FIG. 5 shows an example of the system of the present invention.

As shown in FIG. 5, a system with prioritizable resource assignment includes a switching device PBX. The latter is connected to a resource assignment device LM via a CTI interface CTI. Potential resource requestors PRA1, PRA2 and PRA3 communicate with this resource assignment device LM via lines 10, 20 and 30. Although it is shown here that the potential resource requesters are arranged separately as individual computers and connected to LM via a network, in other configurations they may be situated in the same computer as LM and be processed there as different processes. PRA1 to PRA3 must ensure that the messages are processed one after the other, for example in a manner effected by message queues for which queue memories M1, M2 and M3 are present in the potential resource requesters PRA1, PRA2 and PRA3. The message exchange explained above takes place in the arrangement shown.

Although the present invention has been described with reference to specific embodiments, those of skill in the art will recognize that changes may be made thereto without departing from the spirit and scope of the invention as set forth in the hereafter appended claims.

I claim as my invention:

1. A method for assigning resources in a communications system, the method comprising the steps of:

making a first resource request by a second potential resource requestor to an assignment device for an assignment of a resource;

determining, by access to an assignment rank information item, whether a first potential resource requester having a higher assignment rank than the second potential resource requester exists;

sending a first interrogation to be acknowledged, if the potential resource requester has a higher assignment rank than the second potential resource requester, to the first potential resource requestor;

determining if the first potential resource requestor acknowledges the first interrogation without having requested a resource beforehand; and assigning the resource to the second potential resource requestor if the first potential resource requestor acknowledges the first interrogation without having requested a resource beforehand.

2. A method for assignment resource in a communications system as claimed in claim 1, the method further comprising the step of:

sending a least one first event message, prior to the step of assigning, from the assignment device to at least one of the first and second potential resource requesters.

3. A method for assigning resources in a communications as claimed in claim 1, the method further comprising the step of:

directing a further resource request to the assignment device.

4. A method for assigning resources in a communications system as claimed in claim 2, wherein the assignment device sends the first event message to all potential resource requestors.

5. A method for assigning resources in a communications system as claimed in claim 2, wherein all potential resource requesters evaluate event messages one after the other.

6. A method for assigning resources in a communications system as claimed in claim 2, the method further comprising the step of:

assigning the resources to a switching device, wherein the event messages are exchanged via a CTI connection with the assignment device.

7. A system for assigning resources in a communication system, comprising;

an assignment device for assigning the resources to potential resource requesters;

means for sending messages to the potential resource requesters;

means for accessing an assignment information item of at least two of the potential resource requestors;

means for checking an assignment rank of a potential resource requestor wherein, if a resource request of a potential resource requester having a higher assignment rank exists, an inquiry to be acknowledged is sent to the potential resource requester having the higher assignment rank; and means for checking, prior to arrival of the acknowledgement of the inquiry, whether a resource request is made by the potential resource requestor having the higher assignment rank and, only if no resource request is made by the potential resource requestor having a higher assignment rank, an assignment is made of requested resources to the potential resource requestor having the lower assignment rank by the assignment device.

8. A system for assigning resources in a communications system as claimed in claim 7, further comprising:

a switching device connected to the assignment device via a connection with CTI interface, via which event messages are transmitted in the form of events, and in which the potential resource requesters are present as at least one of applications and service features.

9. A system for assigning resources in a communications system as claimed in claim 8, wherein the assignment device is a service-feature server of the switching device.

10. A system for assigning resources in a communications systems as claimed in claim 8, wherein processing means for successively processing the messages are present in the potential resource requesters.

* * * * *